United States Patent
Darling

(10) Patent No.: US 8,129,071 B2
(45) Date of Patent: Mar. 6, 2012

(54) HYDROPHILIC LAYER FOR USE IN A FUEL CELL

(75) Inventor: Robert M. Darling, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 298 days.

(21) Appl. No.: 12/517,076

(22) PCT Filed: Dec. 29, 2006

(86) PCT No.: PCT/US2006/062694
§ 371 (c)(1),
(2), (4) Date: Jun. 1, 2009

(87) PCT Pub. No.: WO2008/082407
PCT Pub. Date: Jul. 10, 2008

(65) Prior Publication Data
US 2010/0068590 A1    Mar. 18, 2010

(51) Int. Cl.
*H01M 8/10* (2006.01)
(52) U.S. Cl. .......................................... 429/483
(58) Field of Classification Search .................... 429/483
See application file for complete search history.

(56) References Cited

U.S. PATENT DOCUMENTS

| 5,234,776 A | 8/1993 | Koseki |
| 5,641,586 A | 6/1997 | Wilson |
| 5,952,119 A | 9/1999 | Wilson |
| 6,329,094 B1 * | 12/2001 | Yasuo et al. ................. 429/444 |
| 2005/0181264 A1 | 8/2005 | Gu et al. |
| 2005/0255373 A1 | 11/2005 | Kimura et al. |

FOREIGN PATENT DOCUMENTS

| EP | 1020942 A1 | 7/2000 |
| GB | 2422716 A1 | 8/2006 |
| JP | 08130025 | 5/1996 |
| JP | 2005116179 | 4/2005 |
| WO | 2005091416 A2 | 9/2005 |

OTHER PUBLICATIONS

International Search Report and Written Opinion of the International Searching Authority for International application No. PCT/US2006/062694 mailed Aug. 22, 2007.
International Preliminary Report on Patentability for International application No. PCT/US2006/062694 mailed May 22, 2008.

* cited by examiner

*Primary Examiner* — Ula C. Ruddock
*Assistant Examiner* — Thomas H. Parsons
(74) *Attorney, Agent, or Firm* — Carlson, Gaskey & Olds PC

(57) ABSTRACT

A device that is useful for managing moisture content within a fuel cell assembly (24) includes a hydrophilic layer (46) between a solid reactant distribution plate layer and a hydrophobic layer (38) adjacent to a catalyst layer (34). In disclosed examples, the hydrophilic layer (46) is positioned relative to the reactant distribution plate to have a flow field configuration similar to that of the reactant distribution plate so that the hydrophilic layer does not interfere with reactant flow through the hydrophobic layer to the catalyst layer. A disclosed example includes a reactant distribution plate comprising a solid, non-porous material and the hydrophilic material to establish the hydrophilic layer (46). In another example, the hydrophilic layer (46) is applied to, secured to or positioned against of ribs of the reactant distribution plate.

12 Claims, 2 Drawing Sheets

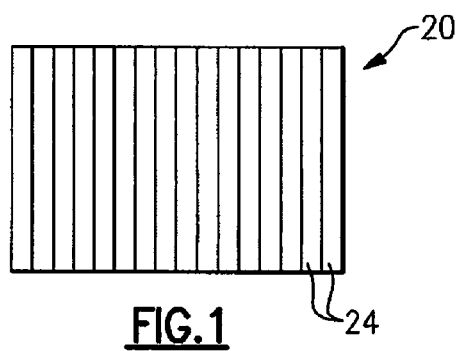
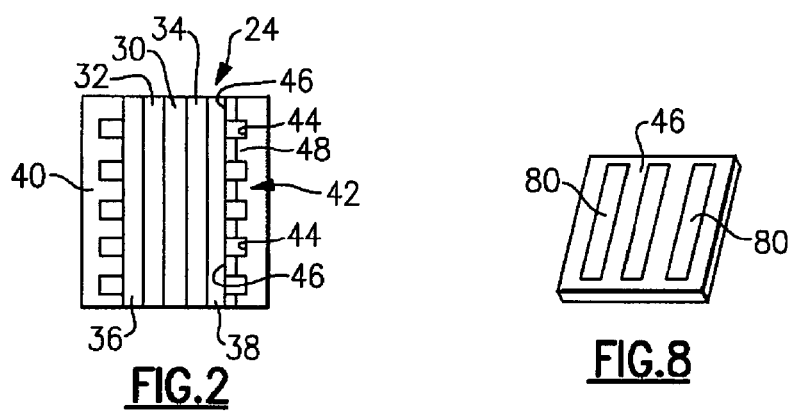
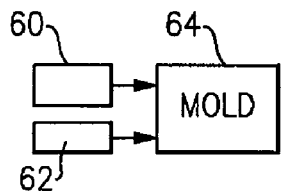
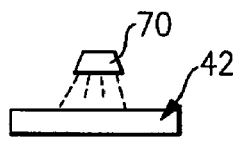
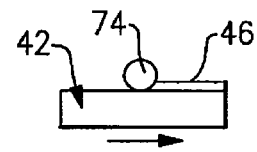

HYDROPHILIC LAYER FOR USE IN A FUEL CELL

CROSS-REFERENCES TO RELATED APPLICATIONS

This Application is the national phase under 35 U.S.C. §371 of International Application No. PCT/US2006/062694, filed Dec. 12, 2006.

BACKGROUND

A variety of fuel cell configurations are known. Many fuel cells have a polymer electrolyte membrane (PEM) between catalyst layers where an electrochemical reaction occurs for generating electricity. There are different types of PEM fuel cells. Some have solid reactant distribution flow field plates associated with each of the catalyst layers. Existing solid reactant distribution plates are made from metal or a carbon composite, for example.

One issue associated with PEM fuel cells that include solid reactant distribution plates is that there is a possibility for damage to one or more fuel cell components as a result of dry out. This issue is particularly prevalent near the fuel and air inlets of a fuel cell stack assembly. Incomplete saturation of the gas streams at the inlets presents an increased possibility for dry out of fuel cell components in that area.

There is a need for an economical and effective approach to minimize dry out in a fuel cell. This invention addresses that need.

SUMMARY

An exemplary device for managing moisture content in a fuel cell includes a reactant distribution plate having a solid, nonporous layer on one side and a plurality of members providing reactant flow channels on an opposite side of the plate. A hydrophilic layer is near an end of at least some of the members distal from the solid, nonporous layer of the reactant distribution plate.

An example fuel cell assembly includes a polymer electrolyte membrane (PEM). Catalyst layers are disposed on each side of the PEM. A hydrophobic gas diffusion layer abuts each catalyst layer. A solid reactant distribution layer is on an opposite side of each hydrophobic gas diffusion layer. The solid reactant distribution layers each have a plurality of reactant flow channels that are open toward the associated gas diffusion layer. A hydrophilic layer is between at least one of the hydrophobic gas diffusion layers and the members of the associated solid reactant distribution layer while leaving at least a portion of at least some of the open channels exposed to the associated gas diffusion layer.

An example method of managing moisture content within a fuel cell includes positioning a hydrophilic layer between a solid reactant distribution plate layer and a hydrophobic gas diffusion layer that is adjacent to a catalyst layer such that the hydrophilic layer is at a location of electrical contact between the solid reactant distribution plate and the hydrophobic gas diffusion layer.

The various features and advantages of the disclosed examples will become apparent to those skilled in the art from the following detailed description. The drawings that accompany the detailed description can be briefly described as follows.

BRIEF DESCRIPTION OF THE DRAWINGS

FIG. 1 schematically illustrates a fuel cell stack assembly.
FIG. 2 schematically illustrates a fuel cell assembly designed according to an embodiment of this invention.
FIG. 5 schematically illustrates one example method of making a device designed according to an embodiment of this invention.
FIG. 6 schematically illustrates another example method.
FIG. 7 schematically illustrates another example method.
FIG. 8 schematically illustrates an example hydrophilic layer designed according to an embodiment of this invention.

DETAILED DESCRIPTION

Figure 3:
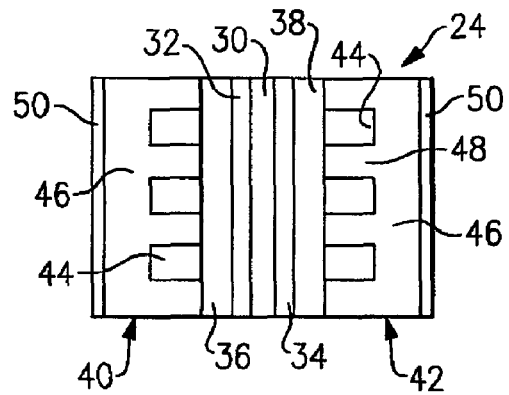
FIG. 3 schematically illustrates a fuel cell assembly designed according to an embodiment of this invention.

Disclosed examples include a hydrophilic layer that is useful for managing moisture content within a fuel cell. In the disclosed examples, the hydrophilic layer is useful for absorbing liquid water while a fuel cell operates, for example, and transporting or wicking the liquid water toward dry parts of a fuel cell. In some examples, the hydrophilic layer is useful for storing water generated during start up.

FIG. 1 schematically shows a fuel cell stack assembly 20 comprising a plurality of fuel cells arranged in a known manner. In this example, the fuel cells 24 include portions that are near an inlet manifold 26 that is useful for supplying fuel or air to the cell stack assembly 20 in a known manner. Other portions of the fuel cells 24 are near an exhaust or outlet manifold 28. At least one of the example fuel cells includes a unique device for managing moisture content.

In some examples, at least one of the fuel cells 24 includes a hydrophilic layer for absorbing liquid water associated with the fluid flowing through the inlet manifold 26 or exhaust manifold 28. Other fuel cells within the cell stack assembly near a designed condensation point, for example, may also include a hydrophilic layer.

FIG. 2 schematically shows selected portions of a fuel cell assembly 24 as one example. The fuel cell assembly 24 includes a polymer electrolyte membrane 30 between catalyst layers 32 and 34. In one example, the catalyst layer 34 is a cathode layer while the catalyst layer 32 is an anode layer. A hydrophobic layer 36 such as a gas diffusion layer is on an opposite side of the catalyst layer 32 from the polymer electrolyte membrane 30. Similarly, a hydrophobic layer 38 is adjacent the catalyst layer 34. In one example, the hydrophobic layers 36 and 38 comprise a bi-layer arrangement including a hydrophobic gas diffusion layer and a hydrophilic sheet.

Reactant distribution plates 40 and 42 are adjacent the hydrophobic layers 36 and 38. In this example, the reactant distribution plates 40 and 42 comprise solid plates, which have at least one solid layer that is not porous. In one example, at least one of the reactant distribution plates comprises metal. In another example, at least one of the reactant distribution plates comprises a carbon composite material.

In the example of FIG. 2, the reactant distribution plate 42 includes a plurality of channels 44 that allow for reactant flow in a known manner. The reactant distribution plate 42 includes a plurality of members 48 that establish the channels 44. In this example, the members 48 comprise ribs that have a length essentially consistent with one of the lateral dimensions of the reactant distribution plate 42 as can be appreciated from the drawing, for example.

In FIG. 2, a hydrophilic layer 46 is positioned between the reactant distribution plate 42 and the hydrophobic layer 38 at a location of electrical contact between the layers. The hydrophobic layer 46 in one example is electrically conductive. In the illustrated example, the hydrophilic layer 46 is configured to be near an end of each member (e.g., rib) 48 of the reactant distribution plate 42.

The hydrophilic layer 46 is useful for absorbing liquid water from the reactant stream flowing within the channels 44, for example. Liquid water may be absorbed near a condensation point, the inlet manifold 26 or exhaust manifold 28, for example. Additionally, liquid water is generated during a start up when the cell stack assembly 20 is cold and the hydrophilic layer 46 is useful for absorbing such water and storing it.

In this example, the hydrophilic layer 46 is configured to have a flow field pattern that resembles the flow field pattern (e.g., follows along an edge of the channels 44) of the reactant distribution plate 42. In this way, the hydrophilic layer 46 does not interfere with diffusion of reactants to the electrodes through the hydrophobic layer 38 because the open sides of the channels 44 remain exposed to the hydrophobic layer 38.

In the example of FIG. 2, only the reactant distribution plate 42 on the cathode side of the fuel cell assembly 24 includes a hydrophilic layer 46. In the example of FIG. 3, both reactant distribution plates 40 and 42 include an associated hydrophilic layer 46. In the example of FIG. 3, much of the reactant distribution plates 40 and 42 comprise a hydrophilic material such as a hydrophilic, porous carbon. The illustrated body and ribs 48 establishing the channels 44 of the reactant distribution plates 40 and 42 comprise the hydrophilic material. A solid layer 50 is on an end of the reactant distribution plates furthest from the hydrophobic layers 36 and 38, respectively. In one example, the solid layers comprise metal plates. In another example, the solid layers each comprise a solid, non-porous carbon layer. In one example, the solid layer 50 comprises a cap secured to the side of the hydrophilic porous material. The solid layers 50 in this example provide the function of a solid reactant distribution plate while the remainder of each plate provides the hydrophilic layer for liquid absorption.

Figure 4:
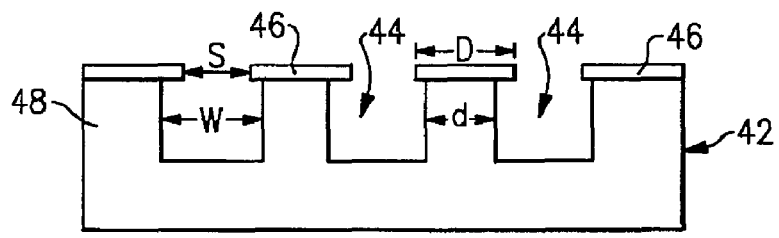
FIG. 4 schematically illustrates selected portions of another example embodiment.

FIG. 4 schematically illustrates another example arrangement. In this example, a reactant distribution plate 42 includes a body and members (e.g., ribs) 48 that are made from a solid, non-porous material such as a carbon composite or metal. A hydrophilic layer 46 is associated with ends of the ribs 48 that are distal from an associated hydrophobic layer 38 when the reactant distribution plate 42 is in place within a fuel cell assembly. The hydrophilic layer 46 has a flow field pattern similar in design, although different in size, compared to the flow field pattern established by the ribs 48. As can be appreciated from the illustration, each rib 48 includes a dimension d (e.g., a width) while each portion of the hydrophilic layer 46 has a corresponding dimension D (e.g., a width) that is larger than the rib dimension d. Also, the width W of each channel 44 is greater than a spacing S between edges of the portions of the hydrophilic layer 46. In such an example, the hydrophilic layer 46 leaves at least a portion of at least some of the channels exposed to the associated hydrophobic layer. Therefore, the hydrophilic layer 46 still allows for reactant flow through the associated hydrophobic layer (e.g., 36 or 38) but provides for additional liquid, absorption within the flow channels 44.

There are a variety of techniques for establishing a hydrophilic layer 46 as shown in the example embodiments. FIG. 5 schematically illustrates one example technique where a material supply 60 of a non-porous carbon and a material supply 62 of a hydrophilic, porous carbon provide material into a mold 64 where the reactant distribution plate is molded. Such an example is useful, for example, for making an embodiment like that shown in FIG. 3 or FIG. 2 where the hydrophilic layer comprises a hydrophilic porous carbon layer on the reactant distribution plate 42.

FIG. 6 schematically shows another example arrangement where an applicator 70 applies an electrically conductive, hydrophilic layer material to the body of a reactant distribution plate 42. In one example, the hydrophilic layer is established by spraying on an electrically conductive hydrophilic material. In another example, an application technique such as using a brush or roller establishes the hydrophilic layer 46.

In other examples, the hydrophilic layer comprises premade strips of hydrophilic material that are secured to at least selected portions of the body of the reactant distribution plate. For example, a strip of hydrophilic material may be secured to the end face of each rib 48. FIG. 7 schematically illustrates one example technique where a roll 74 of one or more strips of hydrophilic material is used to apply the hydrophilic layer 46 to the body of the reactant distribution plate 42. Depending on the materials selected, different techniques for securing the hydrophilic layer may be used.

In another example, the hydrophilic layer 46 comprises at least one piece of material that is independent of and separate from the body of the reactant distribution plate. FIG. 8 schematically illustrates one example hydrophilic layer 46 having a plurality of openings 80 that correspond to the positions of the channels 44 in a reactant distribution plate. The example piece of material from FIG. 8 may be inserted into position between the reactant distribution plate and corresponding hydrophobic layer during the process of assembling a fuel cell.

One example includes establishing a hydrophilic layer by treating a rectangular piece of Toray H-060 with tin oxide to make it hydrophilic. The channel pattern is then formed by pressing the rectangular sheet against a flow field plate with a foam pad, which serves to cut the channels out. Another example includes carbon fiber papers instead of the Toray. Another example includes molding graphite with a wettable agent like tin or titanium oxide onto the reactant side of a solid plate. This approach is useful with a solid plate before or after a channel pattern is established.

Figure 9:
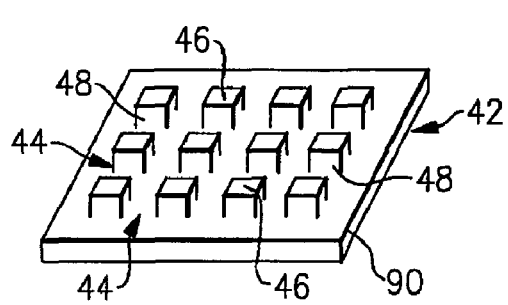
FIG. 9 schematically illustrates another example embodiment.

FIG. 9 shows another example reactant distribution plate 42. In this example, the members 48 comprise posts or bosses formed on a plate. The reactant flow channels 44 comprise the spacing between the members 48. The body 90 of the plate 42 in one example is solid and non-porous. The hydrophilic layer 46 in one example is only on the end of at least some of the post members 48 in a location that will be in electrical contact with a gas distribution layer when the reactant distribution plate 42 is in position within a fuel cell assembly.

Figure 10:
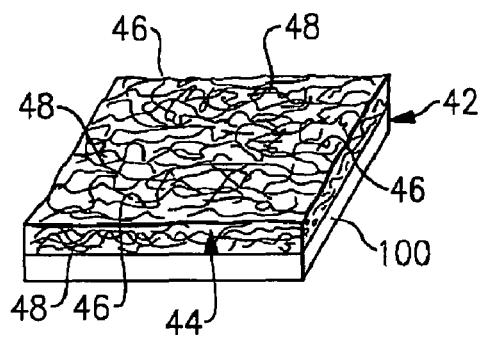
FIG. 10 schematically illustrates another example embodiment.

FIG. 10 shows another example reactant distribution plate 42 having a solid layer 100 and a plurality elongated strand members 48 that are arranged in a woven or spun pattern to establish the channels 44 along one side of the solid layer 100. In one example, at least the solid layer 100 is non-porous. In one example, the hydrophilic layer 46 is along the edges of at least some of the elongated strand members 48 along the side that is placed into electrical contact with a gas diffusion layer when the reactant distribution plate is placed in a fuel cell assembly.

The disclosed examples provide a reservoir for liquid water that is outside of the reactant flow paths. The disclosed examples allow for improving humidification in dry regions of a fuel cell. One advantage to the disclosed examples is that the reservoir of liquid water resides outside of the reactant flow paths so that it does not interfere with a desired level of fuel cell operation.

The preceding description is exemplary rather than limiting in nature. Variations and modifications to the disclosed examples may become apparent to those skilled in the art that do not necessarily depart from the essence of this invention. The scope of legal protection can only be determined by studying the following claims.

I claim:

1. A fuel cell assembly, comprising:
a polymer electrolyte membrane;
a catalyst layer on each side of the polymer electrolyte membrane;
a hydrophobic gas diffusion layer adjacent each catalyst layer;
a solid reactant distribution plate adjacent each hydrophobic layer, the reactant distribution plate comprising a plurality of members spaced from each other to establish channels between the members with an exposed material of the members facing each other on opposite sides of each channel establishing a width of each channel; and
a hydrophilic layer in electrical contact with at least one of the hydrophobic layers and the corresponding reactant distribution plate, wherein the hydrophilic layer comprises portions between ends of the distribution plate members and the gas diffusion layer, the portions of the hydrophilic layer having a larger dimension than the ends of the members of the reactant distribution plate such that a spacing between the portions of the hydrophilic layer is less than the width of the channels of the corresponding reactant distribution plate.

2. The fuel cell assembly of claim 1, wherein the hydrophilic layer is electrically conductive.

3. The fuel cell assembly of claim 1, wherein the hydrophilic layer is distinct from the reactant distribution plate.

4. The fuel cell assembly of claim 1, wherein each of the members comprises a rib.

5. The fuel cell assembly of claim 1, wherein each of the members comprises a boss.

6. The fuel cell assembly of claim 1, wherein each of the members comprises an elongated strand.

7. The fuel cell assembly of claim 1, wherein at least a portion of at least some of the members of the reactant distribution plate comprises a hydrophilic material.

8. The fuel cell assembly of claim 1, wherein each of the at least some of the members is entirely made of a hydrophilic material.

9. The fuel cell assembly of claim 1, wherein the reactant distribution plates comprise a hydrophilic material and a solid, non-porous material.

10. The fuel cell assembly of claim 9, wherein the solid, non-porous material comprises a cap on the one side of the reactant distribution plate.

11. The fuel cell assembly of claim 1, wherein the hydrophilic layer does not have any portion inside of any of the channels of the solid reactant distribution plate.

12. The fuel cell assembly of claim 1, wherein the hydrophilic layer does not cover any of the material of the members facing each other on opposite sides of each channel of the solid reactant distribution plate.

* * * * *